(12) United States Patent
Constant

(10) Patent No.: US 7,766,058 B2
(45) Date of Patent: Aug. 3, 2010

(54) METHOD AND APPARATUS FOR TRANSFERRING LIQUIDS

(76) Inventor: Jim Constant, 690 Victoria, Westmount, Quebec (CA) H3Y 2S1

( * ) Notice: Subject to any disclaimer, the term of this patent is extended or adjusted under 35 U.S.C. 154(b) by 1212 days.

(21) Appl. No.: 11/351,201

(22) Filed: Feb. 9, 2006

(65) Prior Publication Data

US 2006/0207439 A1    Sep. 21, 2006

(30) Foreign Application Priority Data

Feb. 10, 2005 (CA) .................................. 2496980
Aug. 8, 2005 (CA) .................................. 2514814

(51) Int. Cl.
B65B 1/04    (2006.01)
(52) U.S. Cl. ........................ 141/301; 141/382
(58) Field of Classification Search ............ 141/1, 141/2, 18, 198, 285, 301, 382; 99/403, 407, 99/408; 137/396, 397
See application file for complete search history.

(56) References Cited

U.S. PATENT DOCUMENTS 5,870,945 A * 2/1999 Bivens ........................ 99/408
6,792,983 B2 * 9/2004 Allora ......................... 141/98

* cited by examiner

*Primary Examiner*—Gregory L Huson
*Assistant Examiner*—Jason K Niesz
(74) *Attorney, Agent, or Firm*—Eric Fincham

(57) ABSTRACT

A method and system for replacing used oil in a vat, the system including a nozzle having inner and outer concentric passageways, the outer passageway being connected to a supply of replacement oil, pumps associated with each of the inner and outer passageways, with a valve structure and a nozzle, the valve structure having biasing means. The system is suitable for pumping hot oil from a vat such as used in commercial kitchens to a storage receptacle and subsequently pumping replacement oil into the vat.

3 Claims, 3 Drawing Sheets

METHOD AND APPARATUS FOR TRANSFERRING LIQUIDS

FIELD OF THE INVENTION

The present invention relates to a method and a system for draining fluids from a container and for the refilling thereof.

BACKGROUND OF THE INVENTION

Restaurants, and in particular fast food restaurants, utilize a large amount of cooking oil. The cooking oil is typically employed in fryers which are utilized for frying various foods such as french fries, various meat products, and the like.

As will be appreciated, the cooking oil has a limited life and must be replaced periodically as the oil tends to break down and as is well known, the oil can also impart an off taste to the food.

The used oil frequently contains a substantial amount of animal fat. Since animal fats will congeal at lower temperatures, the cooking oil must be drained while it is hot. A substantial danger exists as the cooking oil represents a fire hazard and also since a hot liquid could cause serious injury to the personnel handling the oil.

It is known in the art to employ a manual method wherein the vat or fryer containing the cooking oil is physically tipped to drain the oil into a disposal container. Such an operation is highly dangerous and is rarely practiced nowadays due to these dangers.

An alternative method is the use of a hose to drain the used oil, the hose being connected to a suitable pump. The use of such a hose can in itself be a danger as the hose will tend to become hot.

SUMMARY OF THE INVENTION

It is an object of the present invention to provide a system for the drainage of a vat containing a hot liquid such as oil.

It is a further object of the present invention to provide a method for the drainage of a vat containing a hot liquid such as oil.

It is a further object of the present invention to provide a system for the drainage of hot oil, and which system is both compact and relatively inexpensive.

According to one aspect of the present invention, there is provided a method for replacing used oil in a vat, the method comprising the steps of supplying a nozzle having inner and outer concentric passageways, each passageway being associated with a pump and connected to a storage receptacle, pumping said used oil through the inner channel from the vat to a storage receptacle, sealing the inner channel and subsequently pumping the replacement oil through the outer channel from a storage receptacle to the vat.

According to a further aspect of the present invention, there is provided a system for replacing used oil in a vat, the system comprising a nozzle having inner and outer concentric passageways, the outer passageway being connected to a supply of replacement oil, pump means associated with each of the inner and outer passageways, a valve structure on the nozzle, the valve structure having biasing means.

In greater detail, the nozzle portion of the assembly must naturally be resistant to heat as it will be immersed in the hot liquid. To this end, a metallic material or certain heat resistant plastics may be employed.

As aforementioned, the inner passageway is the one utilized for emptying the used oil from the vat. In so doing, the outer passageway serves as insulation to substantially lessen the risks of burning from contact with a hot surface.

In the preferred embodiment, the inner conduit will have a check valve located proximate the inlet end thereof. A check valve arrangement will prevent any oil in the inner passageway from seeping back to contaminate new oil placed in the vat.

The nozzle will also include a valve which is effective to block the outer passageway when the inner passageway is being utilized to pump used oil. A biasing means is utilized to bias the valve into a closed position with respect to the outer passageway.

A handle portion of the nozzle assembly will preferably include a guard encircling both conduits. A trigger mechanism is provided to provide the operator control of the pumping means which are utilized to pump the used oil out and to pump the new oil into the vat.

In one embodiment of the present invention, the receptacle for receiving the used oil is arranged atop a bigger container. An advantage of utilizing such an arrangement is that the receptacle, being smaller, will require a smaller capacity pump in order to operate the system. Preferably, the receptacle will utilize an interconnection arrangement with a larger container whereby the used oil in the smaller receptacle will flow into the larger container at predetermined intervals. In order to do so, a valve may be utilized that will allow the used oil from the smaller receptacle to flow into the bigger container when a given weight of used oil is reached. Such valve arrangements are known in the art. Alternatively, one could employ other means such as a sensor for the smaller receptacle such that when a certain volume of used oil is present, a valve is opened to permit fluid flow into the larger container.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
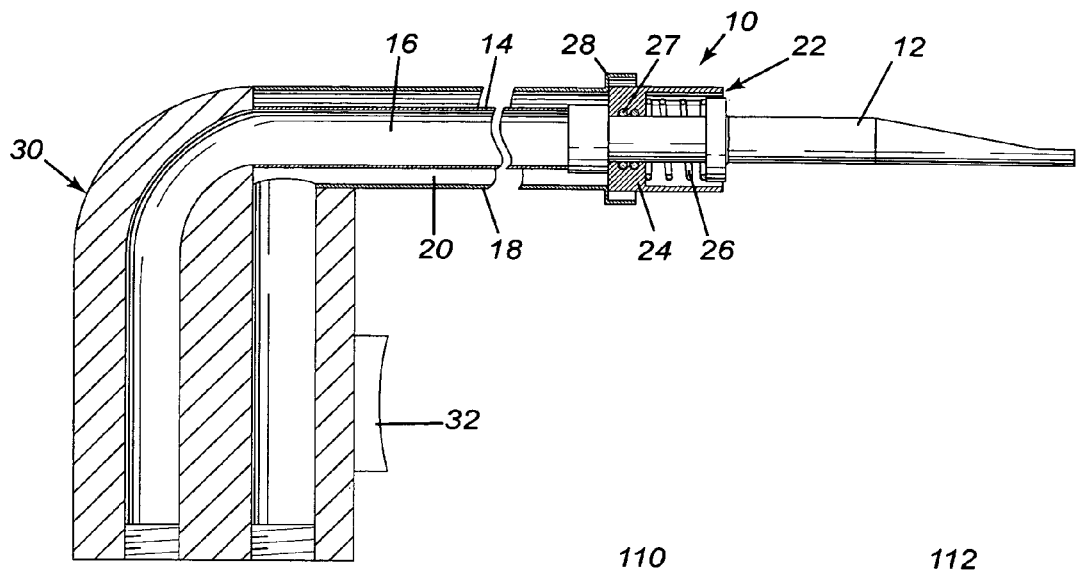
FIG. 1 is a cross sectional view of a first embodiment of a nozzle assembly.

Referring to FIG. 1 initially, there is illustrated therein a nozzle assembly generally designated by reference numeral 10.

Nozzle assembly 10 includes a nozzle 12 which is in fluid communication with an inner conduit 14 which defines an inner passageway 16. Concentric therewith, is an outer conduit 18 enclosing outer passageway 20.

Nozzle 12 includes a valve assembly 22. Valve assembly 22 has a plunger 24 biased by a spring 26 to seal outer passageway 20. A pair of O rings 27 are provided. It will also be noted that there is provided a discharge outlet 28 from outer conduit 18.

A handle portion 30 includes a trigger 32 for operating the pumps as will be discussed in greater detail hereinbelow.

Figure 2A:
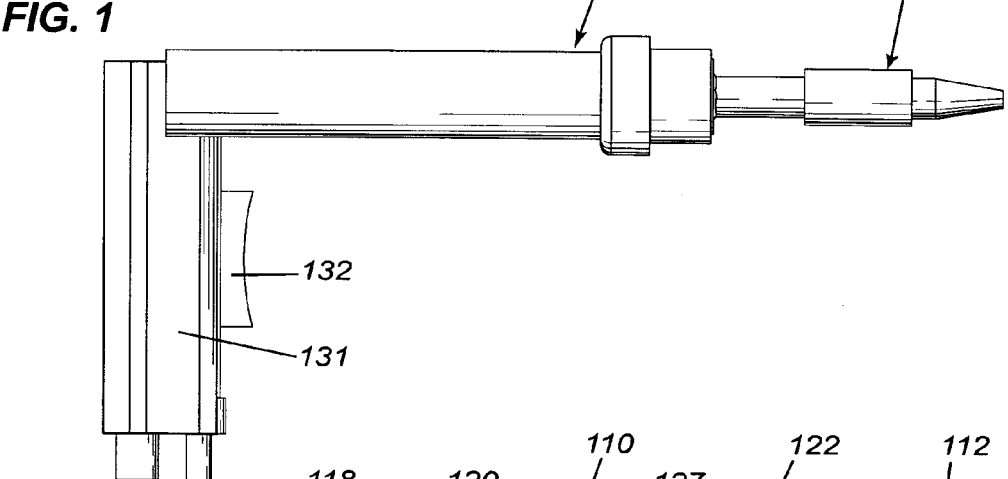
FIG. 2A is a side view of a further embodiment of a nozzle assembly according to the present invention.
Figure 2B:
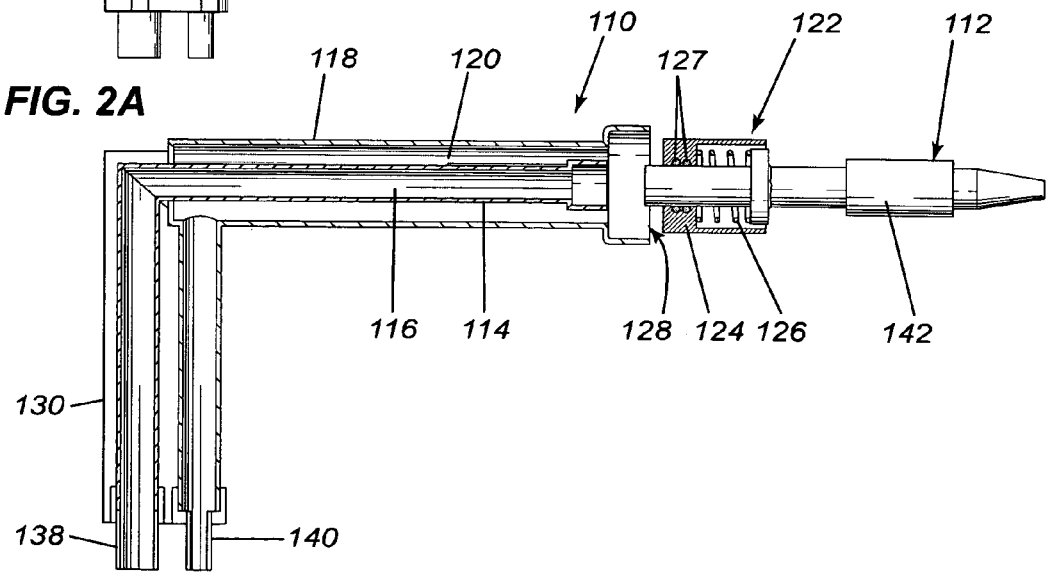
FIG. 2B is a side sectional view thereof.

A slightly modified version of a nozzle assembly 110 is shown in FIG. 2 and similar reference numerals in the 100's are employed for similar components. Nozzle assembly 110 includes a nozzle 112. An inner conduit 114 forms an inner passageway 116 while an outer conduit 118 defines an outer passageway 120. In a manner similar to the previously described embodiment, there is provided a valve assembly 122 which includes a plunger 124 biased by spring 126 to seal outer passageway 120. Again, a discharge outlet 128 is provided. Handle portion 130 includes a protective housing 131 extending thereabout and which will have a trigger 132 mounted thereon. Protective housing 131 may be of a metallic material and connected only to outer conduit 118 to prevent transfer from inner conduit 114. As may be seen in FIGS. 2A and 2B, there is provided a discharge hose 138 to carry used oil from inner conduit 114 while there is also provided a new oil hose 140 which is in fluid communication with outer passageway 120. In this embodiment, there is also provided a check valve 142 on nozzle 112; check valve 142 is operative to seal inner passageway 116 when oil is no longer flowing therethrough.

Figure 4:
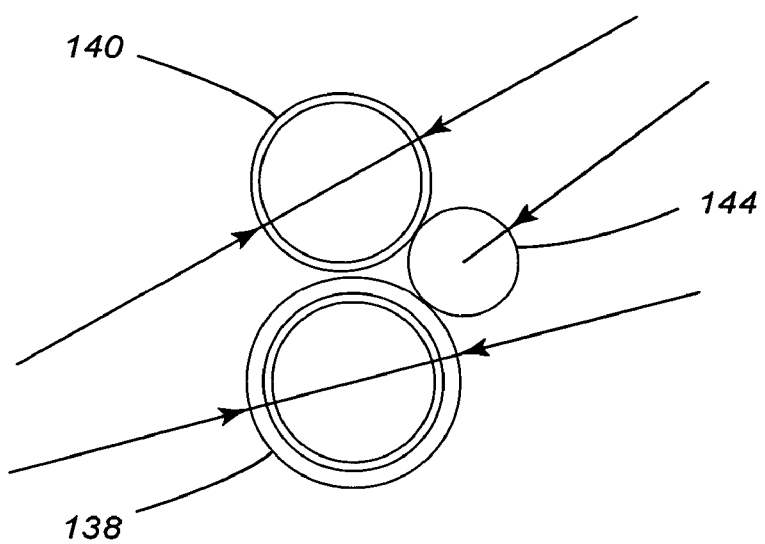
FIG. 4 is a cross sectional view illustrating the placement of conduits for carrying the used and new oil.
Figure 5:
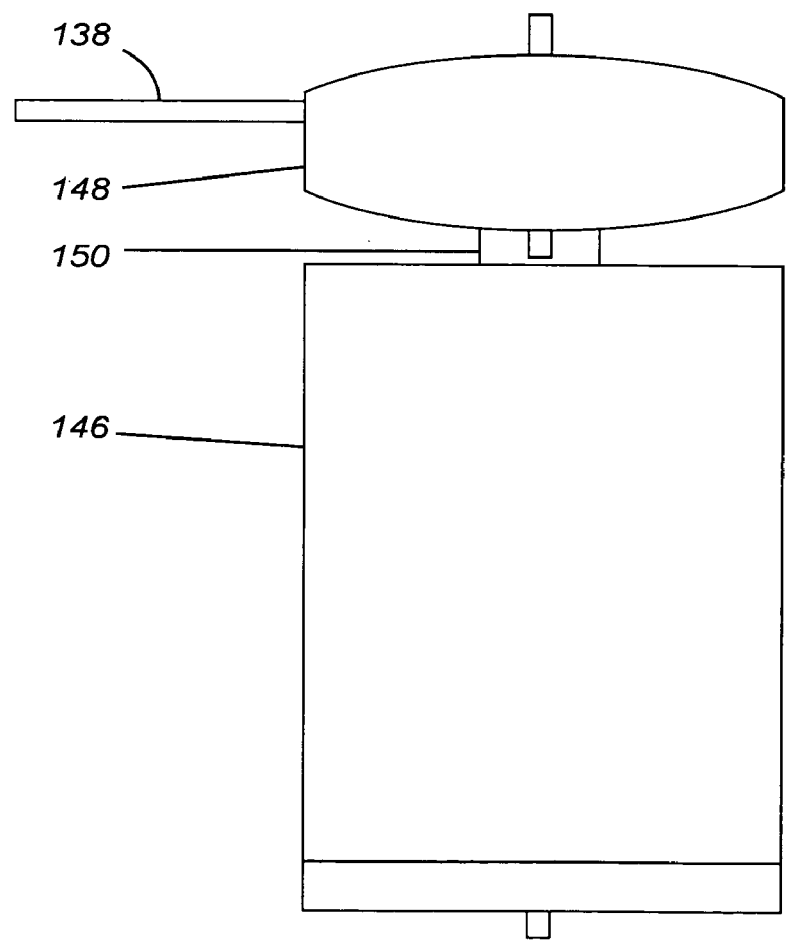
FIG. 5 is a schematic view illustrating a smaller receptacle and a larger container for receiving the used oil.

Referring to FIGS. 4 and 5, new oil hose 140 and discharge hose 148 may be extruded so as to be joined together. A third hose or conduit 144 may be provided for electrical wires extending between trigger 132 and the pumps (not shown) for the used oil and new replacement oil.

As seen in FIG. 5, there is provided a container 146 for the used oil. In this embodiment, there may be provided a smaller upper reservoir 148 to receive the used oil through hose 138. A valve 150 is provided to permit the passage of oil from upper reservoir 148 to container 146. The valve may either be a weight sensitive type wherein, once a certain amount of used oil is present in upper reservoir 148, the valve automatically opens. Alternatively, valve 150 may be of the type wherein it is activated electrically by the presence of a predetermined amount of oil in upper reservoir 148.

Figure 3A:
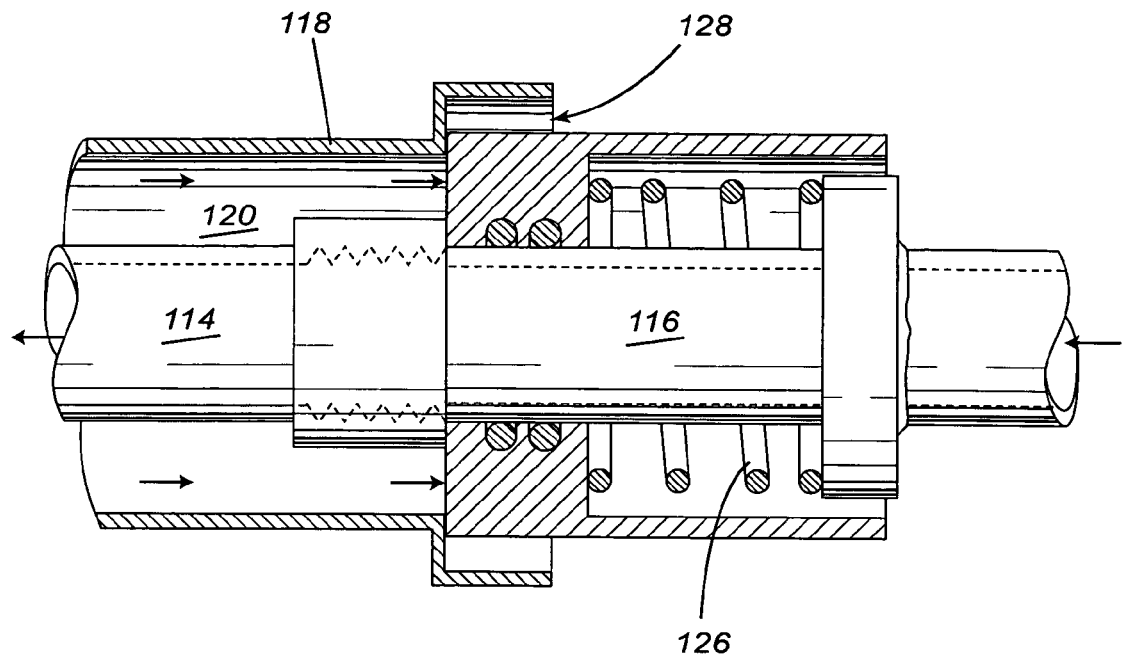
FIG. 3A is a cross sectional view of the valve in the nozzle when the used oil is being pumped out.

Operation of the system is illustrated in FIG. 3A wherein used oil is being transferred through inner conduit 114. In this arrangement, a suitable pump (not shown) withdraws oil through inner passageway 116 while the action of spring 126 seals outer passageway 120.

Figure 3B:
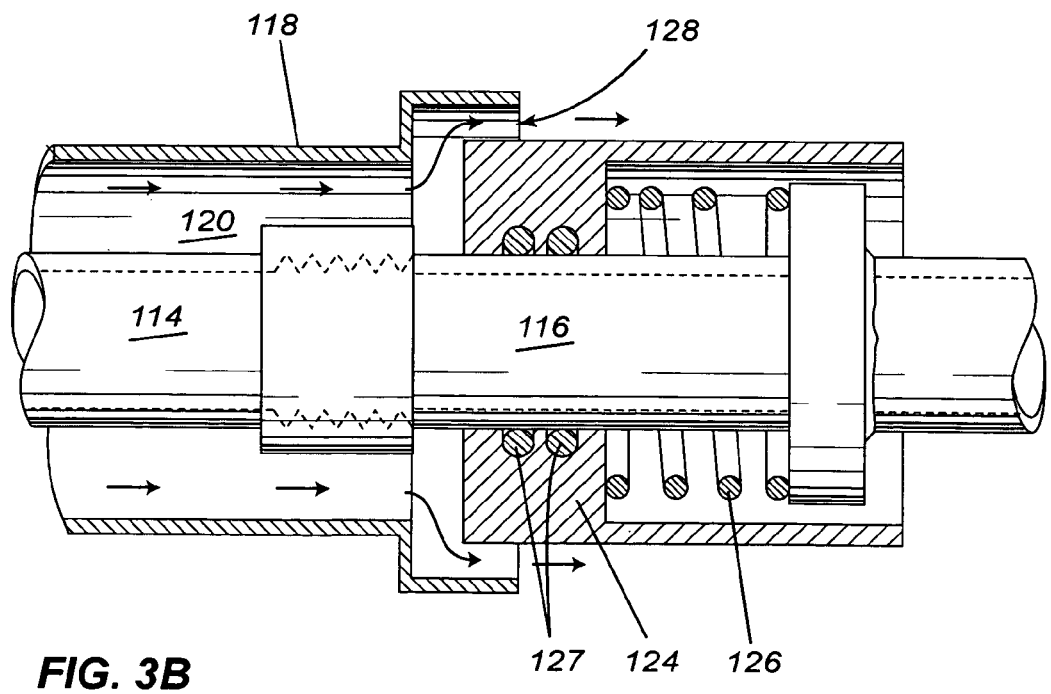
FIG. 3B is a view similar to FIG. 3A showing the valve when the new oil is being pumped into the vat.

As shown in FIG. 3B, once the pump for new oil is activated, pressure is exerted on plunger 124 to permit the new oil to flow through discharge outlet 128.

It will be understood that the above described embodiments are for purposes of illustration only and that changes and modifications may be made thereto without departing from the spirit and scope of the invention.

I claim:

1. A system for replacing used oil in a vat, the system comprising:
    a nozzle having inner and outer concentric passageways;
    said outer passageway being connected to a supply of replacement oil;
    pump means associated with each of said inner and outer passageways;
    a plunger extending about said inner passageway, said plunger being moveable between an open position to permit fluid passage to said outer passageway and a closed position wherein said outer passageway is sealed; and
    a check valve on said inner passageway.

2. The system of claim 1 further including a container to receive said used oil from said inner passageway.

3. The system of claim 2 further including a receptacle mounted on top of said container, said receptacle being sized to be smaller than said container, said receptacle being connected to said inner passageway, and fluid communication between said receptacle and said container.

* * * * *